US009451396B2

United States Patent
Takatsuji

(10) Patent No.: US 9,451,396 B2
(45) Date of Patent: Sep. 20, 2016

(54) FACILITY SEARCH SYSTEM, FACILITY SEARCH PROGRAM PRODUCT, AND IN-VEHICLE DEVICE

(71) Applicant: DENSO CORPORATION, Kariya, Aichi-pref. (JP)

(72) Inventor: Masaya Takatsuji, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 33 days.

(21) Appl. No.: 14/397,808

(22) PCT Filed: Apr. 24, 2013

(86) PCT No.: PCT/JP2013/002763
§ 371 (c)(1),
(2) Date: Oct. 29, 2014

(87) PCT Pub. No.: WO2013/168383
PCT Pub. Date: Nov. 14, 2013

(65) Prior Publication Data
US 2015/0126224 A1    May 7, 2015

(30) Foreign Application Priority Data

May 7, 2012   (JP) ................................ 2012-106050
Jan. 28, 2013   (JP) ................................ 2013-013486

(51) Int. Cl.
*H04W 4/02* (2009.01)
*H04W 64/00* (2009.01)
(Continued)

(52) U.S. Cl.
CPC ................ *H04W 4/02* (2013.01); *G01C 21/20* (2013.01); *G01C 21/3679* (2013.01); *G06F 17/30241* (2013.01); *G06Q 10/10* (2013.01); *G06Q 50/01* (2013.01); *H04L 67/04* (2013.01); *H04L 67/12* (2013.01); *H04L 67/18* (2013.01); *H04L 67/303* (2013.01); *H04W 4/046* (2013.01); *H04W 64/00* (2013.01); *G08G 1/0962* (2013.01)

(58) Field of Classification Search
CPC . G01C 21/20; G01C 21/3679; H04W 4/046; H04W 64/00; H04L 67/12; G08G 1/0962
USPC ...................................................... 455/456.3
See application file for complete search history.

(56) References Cited

U.S. PATENT DOCUMENTS 6,484,093 B1 * 11/2002 Ito .......................... G01C 21/34
340/990
6,748,321 B2 * 6/2004 Watanabe .......... G01C 21/3423
340/990
(Continued)

FOREIGN PATENT DOCUMENTS

JP    2001148092 A    5/2001
JP    2001148092 A  *  5/2001 ............. G01C 21/00
(Continued)

OTHER PUBLICATIONS

International Search Report and Written Opinion (in Japanese with English Translation) for PCT/JP2013/002763, mailed Jul. 23, 2013; ISA/JP.

*Primary Examiner* — William Nealon
(74) *Attorney, Agent, or Firm* — Harness, Dickey & Pierce, P.L.C.

(57) ABSTRACT

A facility search system includes a mobile communication terminal communicably connected with a server and independently performing a registration process to register a facility visited by a user as a visited facility in the server and an in-vehicle device provided in a vehicle and communicably connected with the mobile communication terminal and performing the registration process in cooperation with the mobile communication terminal. The server provides a visited-facility registration service in which the facility visited by the user is registered as the visited facility. The in-vehicle device acquires a device position indicating a current position of the vehicle, compares the device position with a preliminarily set destination facility position to determine whether the vehicle arrives at the destination facility, and controls the mobile communication terminal to register the destination facility as the visited facility in the server when determining that the vehicle arrives at the destination facility.

13 Claims, 11 Drawing Sheets

(51) Int. Cl.
*H04W 4/04* (2009.01)
*G01C 21/20* (2006.01)
*G01C 21/36* (2006.01)
*G06Q 10/10* (2012.01)
*G06Q 50/00* (2012.01)
*G06F 17/30* (2006.01)
*H04L 29/08* (2006.01)
*G08G 1/0962* (2006.01)

(56) References Cited

U.S. PATENT DOCUMENTS

| | | | |
|---|---|---|---|
| 2004/0166880 A1* | 8/2004 | Horikami | B60L 3/0038 455/456.1 |
| 2009/0318163 A1* | 12/2009 | George | G01S 5/02 455/456.1 |
| 2010/0057334 A1* | 3/2010 | Ramaswamy | G01C 21/3492 701/117 |
| 2011/0184789 A1* | 7/2011 | Kirsch | H04W 4/04 705/14.1 |
| 2012/0271547 A1* | 10/2012 | Mori | B60L 11/184 701/527 |

FOREIGN PATENT DOCUMENTS

| | | |
|---|---|---|
| JP | 2001215128 A | 8/2001 |
| JP | 2007241943 A | 9/2007 |
| JP | 2009085963 A | 4/2009 |
| JP | 2010026104 A | 2/2010 |
| JP | 2010034759 A | 2/2010 |
| JP | 2013002898 A | 1/2013 |
| JP | 2013076640 A | 4/2013 |

* cited by examiner

FACILITY SEARCH SYSTEM, FACILITY SEARCH PROGRAM PRODUCT, AND IN-VEHICLE DEVICE

CROSS REFERENCE TO RELATED APPLICATIONS

This application is a U.S. National Phase Application under 35 U.S.C. 371 of International Application No. PCT/JP2013/002763 filed on Apr. 24, 2013 and published in Japanese as WO 2013/168383 A1 on Nov. 14, 2013. This application is based on and claims the benefit of priority from Japanese Patent Application No. 2012-106050 filed on May 7, 2012, and Japanese Patent Application No. 2013-013486 filed on Jan. 28, 2013, the disclosures of which are incorporated herein by reference.

TECHNICAL FIELD

The present disclosure relates to a facility search system, a facility search program product, and an in-vehicle device, each of which enables a use of a service provided by an external server.

BACKGROUND ART

Conventionally, a system which is able to provide information using a database stored in a server in accordance with a purpose of a user (for example, see the following Patent Literature) has been known.

However, in recent years, in addition to a reception of information from a server on a network, a transmission of information is performed by a user. For example, a service, such as a Social Networking Service (SNS), provides a visited-facility registration service (hereinafter referred to as check-in service). The visited-facility registration service provides facility information related to a facility located around a current position of a user, registers (checks in) a visit history to the facility in a server in response to a manipulation of the user, and enables a share of check-in information related to, such as a facility name or visit time.

Conventionally, the check-in service described above has been provided via a mobile communication terminal to the user. The server corresponding to the check-in service provides facility information based on the current position of the user. Accordingly, to perform a check-in, the user needs to move to a facility serving as a check-in target and select an intended facility from multiple facilities located around the check-in target. The mobile communication terminal sometimes may have degraded accuracy in determining the current position caused by a bad radio wave condition (such as, for example, an interruption of radio waves or multipath interference) of a Global Positioning System (GPS) that detects a position. In this case, to perform the check-in, the user needs to perform a manipulation such as searching a facility list including check-in candidates for a check-in target or searching for the check-in target using a keyword, or the like.

PRIOR ART LITERATURE

Patent Literature

Patent Literature 1: JP 2007-241943 A

SUMMARY OF INVENTION

In view of the foregoing difficulties, it is an object of the present disclosure to provide a facility search system, a facility search program product, and an in-vehicle device, in which a quantity of manipulations performed by the user for registering a visited facility in the server is substantially reduced.

According to a first aspect of the present disclosure, a facility search system includes a mobile communication terminal and an in-vehicle device. The mobile communication terminal is communicably connected with a server and independently performs a registration process for registering a facility visited by a user as a visited facility in the server. The server provides a visited-facility registration service in which the facility visited by the user is registered as the visited facility. The in-vehicle device is provided in a vehicle and is communicably connected with the mobile communication terminal. The in-vehicle device performs the registration process in cooperation with the mobile communication terminal. In the registration process, the in-vehicle device acquires a device position indicating a current position of the vehicle, determines whether the vehicle arrives at a destination facility by comparing the device position with a position of the destination facility, and controls the mobile communication terminal to register the destination facility as the visited facility in the server when determining that the vehicle arrives at the destination facility. Herein, the destination facility is preliminarily set in the in-vehicle device.

With the above facility search system, a quantity of manipulations performed by the user for registering the facility visited by the user in the server is substantially reduced.

According to a second aspect of the present disclosure, a facility search program product is stored in a non-transitory tangible computer-readable storage medium and includes instructions to be executed by an in-vehicle device that is provided in a vehicle and is communicably connected with a mobile communication terminal. The mobile communication terminal is communicably connected with a server and independently performs a registration process for registering a facility visited by a user in the server. The server provides a visited-facility registration service in which the facility visited by the user is registered as a visited facility. The instructions for implementing setting a destination facility based on a first database, detecting a device position indicating a current position of the vehicle, determining whether the vehicle arrives at the destination facility by comparing the device position with the destination facility information, and registering the destination facility as the visited facility in the server when determining that the vehicle arrives at the destination facility. The first database is used in a navigation function for performing a route guidance to the vehicle and stores destination facility information to be used for specifying the destination facility.

With the above facility search program product, a quantity of manipulations performed by the user for registering the facility visited by the user in the server is substantially reduced.

According to a third aspect of the present disclosure, an in-vehicle device is provided in a vehicle and communicably connected with a mobile communication terminal. The mobile communication terminal is communicably connected with a server and independently performs a registration process for registering a facility visited by a user in the server. The server provides a visited-facility registration service in which the facility visited by the user is registered as a visited facility. The in-vehicle device includes a communication unit performing a communication with the mobile communication terminal, a storage unit including a first database that is used in a navigation function for performing a route guidance to the vehicle and storing destination facility information to be used for specifying a destination facility, a destination setting unit setting the destination facility based on the destination facility information stored in the first database, a device position detection unit detecting a device position indicating a current position of the vehicle, an arrival determination unit determining whether the vehicle arrives at the destination facility by comparing the device position with the destination facility information, and a control unit controlling the mobile communication terminal to perform the registration process for registering, in the server, the destination facility as the visited facility when the arrival determination unit determines that the vehicle arrives at the destination facility.

With the above in-vehicle device, a quantity of manipulations performed by the user for registering the facility visited by the user in the server is substantially reduced.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following will describe embodiments of the present disclosure with reference to the drawings. Note that configurations substantially common to each of the embodiments will be described with the same reference symbols.

(First Embodiment)

The following will describe a first embodiment of the present disclosure with reference to FIGS. 1 to 9.

Figure 1:
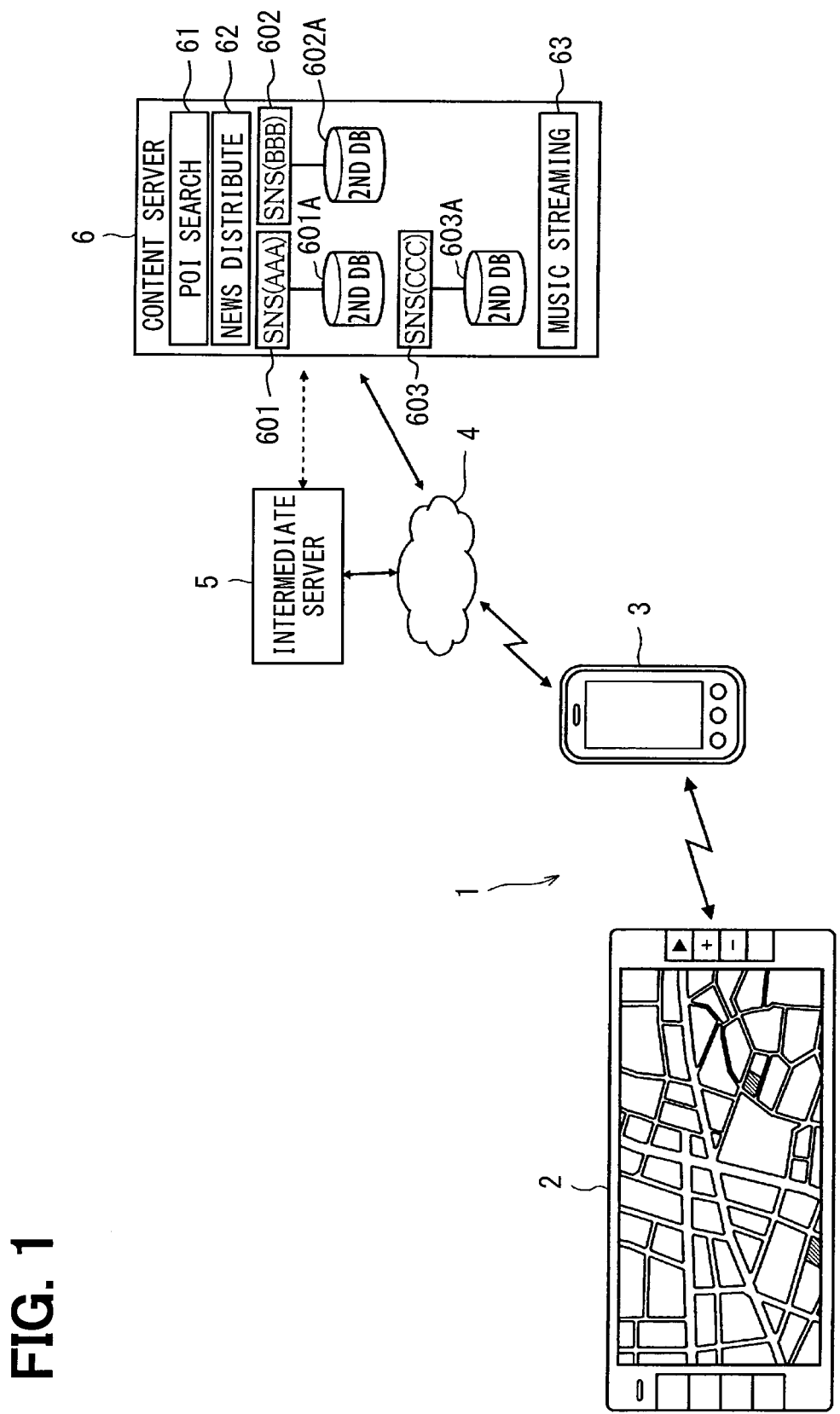
FIG. 1 is a diagram schematically showing a configuration of a facility search system according to a first embodiment of the present disclosure.

As shown in FIG. 1, a facility search system 1 includes a facility search device 2 as an in-vehicle device and a mobile communication terminal 3. The facility search device 2 is communicably connected with the mobile communication terminal 3. The mobile communication terminal 3 is communicably connected with an intermediate server 5 and a content server 6 via an external network 4. Each of the intermediate server 5 and the content server 6 is also referred to as a server. In the present embodiment, the facility search device 2 is equipped to a vehicle, which is not shown. The facility search device 2 may be provided in a compartment of the vehicle in a fixed manner, or may be provided in the compartment of the vehicle in a movable manner.

First, a brief description regarding a use of a content in the facility search system 1 will be given. The facility search system 1 enables a use of various contents provided by the content server 6. Each of the contents includes an application program and data for providing a predetermined service to a user. In the present embodiment, the contents include, for example, a Point Of Interest (POI) search service, a news delivery service, a Social Networking Service (SNS), a music streaming service, and the like. These contents are provided by multiple content providers. That is, for example, multiple SNS services may be provided by multiple content providers, such as a provider AM, a provider BBB, and a provider CCC. The providers which provide the respective SNS services store contents in respective second databases (2ND DB) 601A, 602A, and 603A, which are separated from each other. The second databases 601A to 603A are also referred to as server-side databases. When there are multiple types of services are provided and further multiple services having the same type are provided by multiple providers, the content server 6 shown in FIG. 1 may also have a configuration in which one server, which corresponds to one of the providers, is provided for one of the services having the same type, as described above. For example, as shown in FIG. 1, the content server 6 includes a sub-server 61 which provides the POI search service, a sub-server 62 which provides the news delivery service, sub-servers 601, 602, and 603 all of which provide the SNS services, and a sub-server 63 which provides the music streaming service. In the present embodiment, it is assumed that the sub-servers 601 to 603 are provided with respective second DBes 601A to 603A (that is, the content server 6 includes multiple sub-servers).

Above-described multiple contents are provided in respective data formats determined by respective content providers. Accordingly, in the facility search system 1, between facility search device 2 and the content servers 6 or between the mobile communication terminal 3 and the content servers 6, the intermediate server 5 is provided in order to convert the contents provided in various data formats from the respective content providers into a unified data format.

In the present embodiment, among the various services described above, a visited-facility registration service will be described as an example of a description target. The visited-facility registration service is a service that enables a registration (check-in) of a facility as a visited facility in the server when the facility is vised by the user, and enables a sharing of information related to the registered visited facility among users of the visited-facility registration service. The service is hereinafter referred to as a check-in service. In the present embodiment, the check-in service is provided by each SNS. That is, the check-in service is installed as a part of the SNS.

Figure 2:
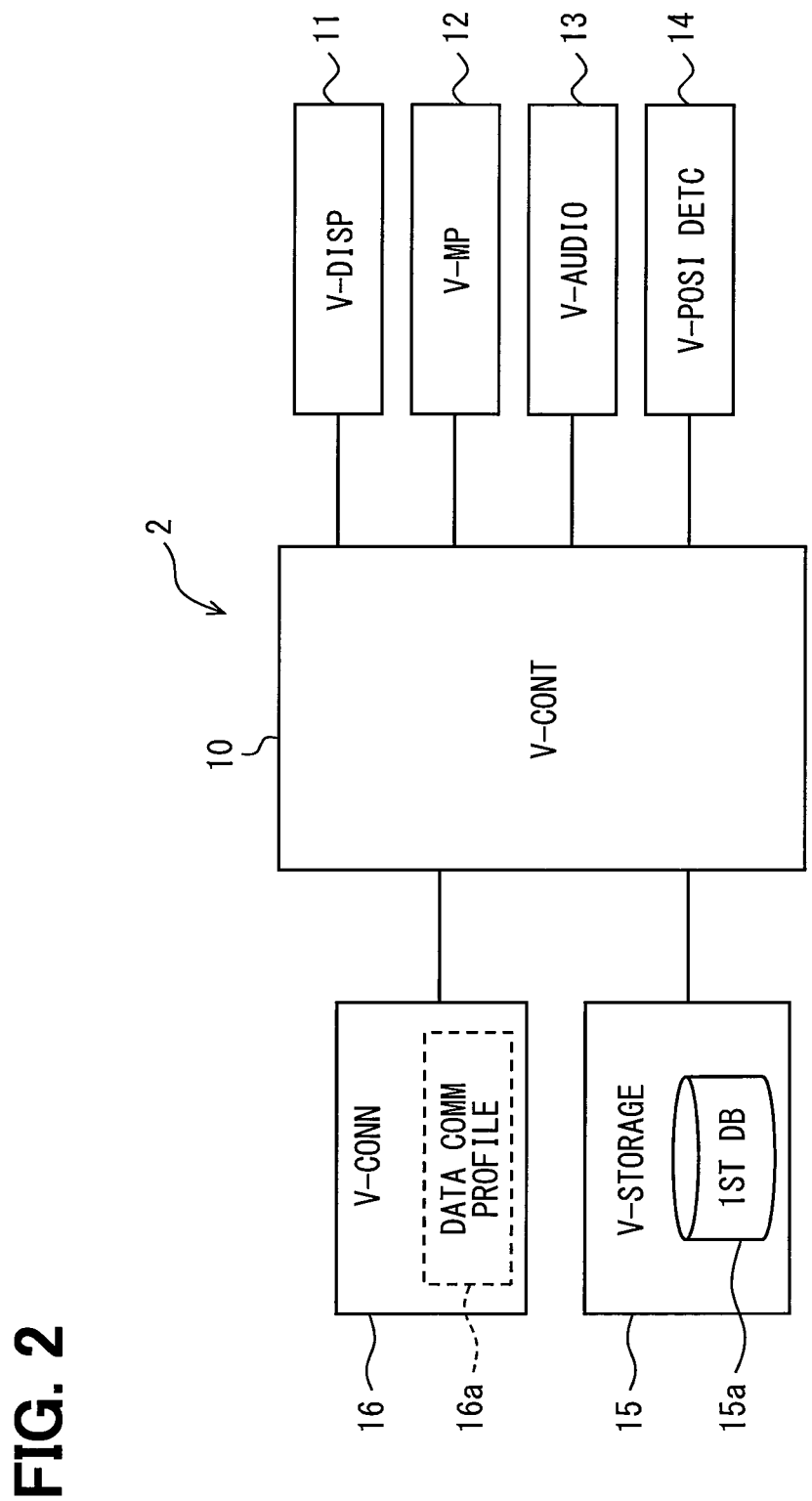
FIG. 2 is a diagram schematically showing a configuration of a facility search device.

As shown in FIG. 2, the facility search device 2 in the facility search system 1 has a vehicle-side control unit (V-CONT) 10, a vehicle-side display unit (V-DISP) 11, a vehicle-side manipulation unit (V-MP) 12, a vehicle-side audio input output unit (V-AUDIO) 13, a vehicle-side position detection unit (V-POSI DETC) 14, a vehicle-side storage unit (V-STORAGE) 15, and a vehicle-side connection unit (V-CONN) 16. The vehicle-side control unit 10 is provided by a microcomputer having a CPU, a ROM, a RAM, and the like which are not shown, and controls the entire facility search device 2 in accordance with the program stored in the ROM or the like. The vehicle-side control unit 10 is capable of executing an application program via which the facility search device 2 is able to cooperate with the mobile communication terminal 3.

As will be described later, the vehicle-side control unit 10 performs an extraction process and a registration process. In the extraction process, the vehicle-side control unit 10 extracts a facility as a check-in candidate in the check-in service provided from each SNS. In the registration process (hereinafter referred to as a check-in process for the sake of convenience), the vehicle-side control unit 10 controls the mobile communication terminal 3 to register the extracted facility as a visited facility in the content server 6, which is managed by each SNS. That is, in the present embodiment, the check-in for registering the visited facility in the content server 6 is performed by the mobile communication terminal 3, and the facility search device 2 is configured to output an instruction to the mobile communication terminal 3 to control the mobile communication terminal 3 to perform the check-in. The vehicle-side control unit 10 also provides a navigation function that guides the vehicle to a destination or the like. The vehicle-side control unit 10 also functions as a destination setting unit, an extraction unit, a registration unit, and an arrival determination unit. In the present embodiment, a navigation device is provided as the facility search device 2.

The vehicle-side display unit 11 is provided by, for example, a liquid crystal display, an organic Electro-Luminescence (EL) display, a plasma display, or the like capable of performing color display. The vehicle-side display unit 11 displays, for example, a manipulation window for manipulating the facility search device 2, a map window when a navigation function is used, and the like. As will be described later, the vehicle-side display unit 11 also displays various manipulation windows during the check-in process. The vehicle-side manipulation unit 12 is provided by a touch panel and tactile switches. The touch panel is disposed corresponding to the vehicle-side display unit 11, and the tactile switches are disposed around the vehicle-side display unit 11, or the like. The user inputs a manipulation to the facility search device 2 via the vehicle-side manipulation unit 12. Note that, for the touch panel, any type, for example, a pressure-sensitive type, an electromagnetic induction type, or an electrostatic induction type can be used. The vehicle-side manipulation unit 12 also functions as a destination setting unit and a manipulation unit.

The vehicle-side audio input output unit 13 has a speaker and a microphone, which are not shown. The vehicle-side audio input output unit 13 outputs, for example, a music file stored in the vehicle-side storage unit 15, a guidance voice supplied by the facility search device 2, and the like. The vehicle-side voice input output unit 13 also receives an audio manipulation made by the user to the facility search device 2, and the like.

The vehicle-side position detection unit 14 has a GPS unit, a gyro sensor, or the like to detect a device position of the facility search device 2, more specifically, a position of the vehicle to which the facility search device 2 is equipped. Note that, since a method of detecting the device position using the GPS unit or the like is well known, a detailed description thereof is omitted herein. The vehicle-side control unit 10 performs the navigation process based on the vehicle position detected by the vehicle-side position detection unit 14. The vehicle-side position detection unit 14 can detect the vehicle position more accurately than the mobile communication terminal 3 by performing a map matching.

The vehicle-side storage unit 15 stores music data, map data to be used for the navigation function, various application programs to be executed by the facility search device 2, and the like. As will be described later, the vehicle-side storage unit 15, using the navigation function, stores a history travel route travelled by the vehicle and one or more history stop positions on the history travel route.

The vehicle-side connection unit 16 performs a communication with the mobile communication terminal 3. In the present embodiment, a wireless communication based on Bluetooth (registered trademark) is used. Hereinafter, Bluetooth (registered trademark) will be referred to as BT and a connection based on BT will be referred to as a BT connection. The vehicle-side connection unit 16 has, for example, a data communication profile (DATA COMM PROFILE) 16a for data communication, and is connected with the mobile communication terminal 3 based on the data communication profile. In the case of using BT, the data communication profile corresponds to a Serial Port Profile (SPP), a Dial-up Networking Profile (DUN), or the like. The vehicle-side connection unit 16 also serves as an acquisition unit.

Figure 3:
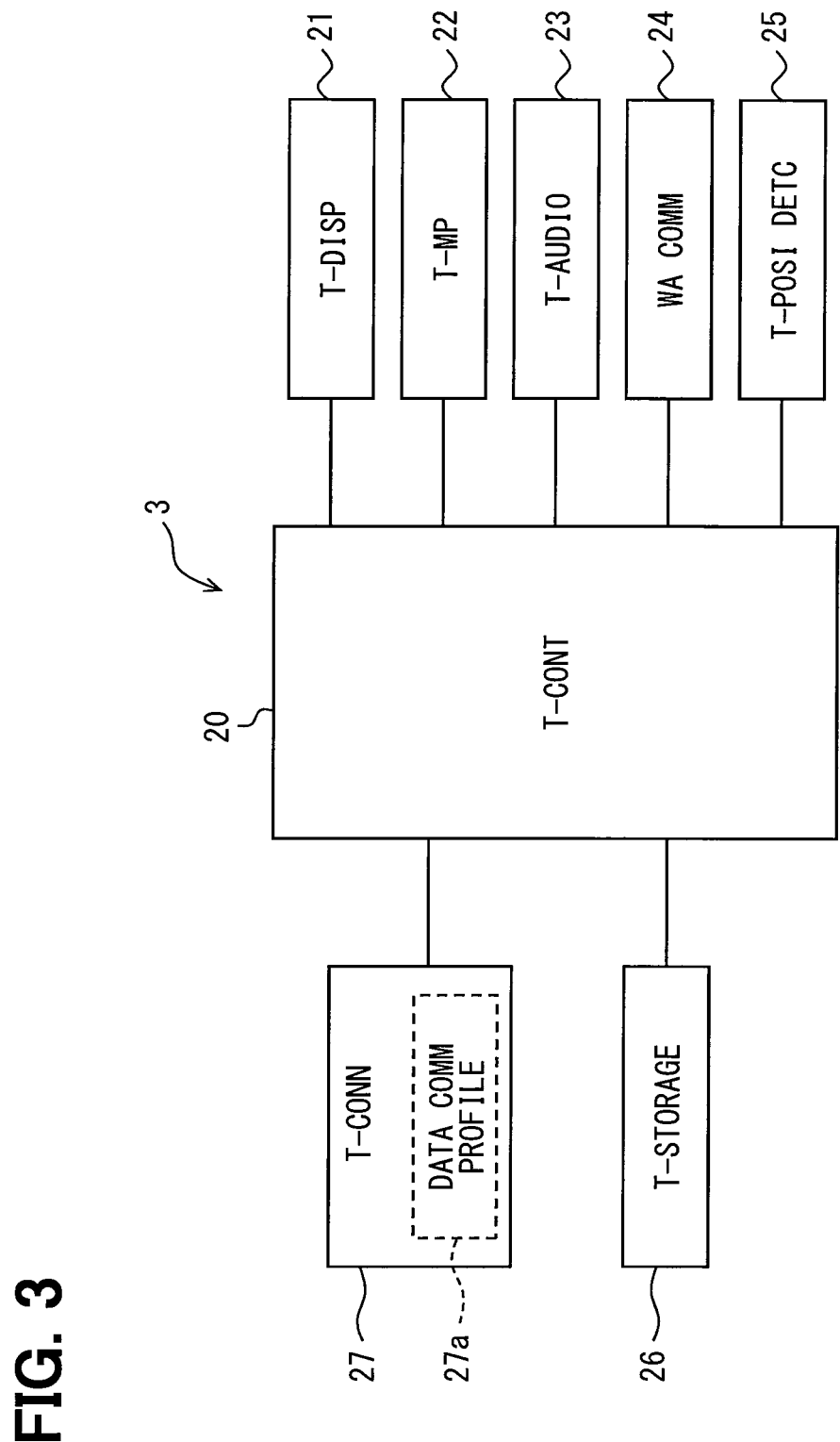
FIG. 3 is a diagram schematically showing a configuration of a mobile communication terminal.

As shown in FIG. 3, the mobile communication terminal 3 has a terminal-side control unit (T-CONT) 20, a terminal-side display unit (T-DISP) 21, a terminal-side manipulation unit (T-MP) 22, a terminal-side audio input output unit (T-AUDIO) 23, a communication unit (WA COMM) 24, a terminal-side position detection unit (T-POSI DETC) 25, a terminal-side storage unit (T-STORAGE) 26, and a terminal-side connection unit (T-CONN) 27. In the present embodiment, a smart phone is provided as an example of the mobile communication terminal 3. As described above, the mobile communication terminal 3 is capable of independently performing the check-in to the content server 6.

The terminal-side control unit 20 of the mobile communication terminal 3 is provided by a microcomputer having a CPU, a ROM, a RAM, and the like which are not shown, and controls the entire mobile communication terminal 3 in accordance with a program stored in the ROM or the like. The terminal-side control unit 20 is capable of executing an application program via which the mobile communication terminal 3 is able to cooperate with the facility search device 2.

The terminal-side display unit 21 is provided by, for example, a liquid crystal display, an organic EL display, or the like capable of color display. The terminal-side display unit 21 displays, for example, phone book data, images or the picture stored in, for example, the terminal-side storage unit 26, or the like. The terminal-side manipulation unit 22 is provided by a touch panel and tactile switches. The touch panel is disposed corresponding to the terminal-side display unit 21, and the tactile switches are disposed around the terminal-side display unit 21, or the like. The mobile communication terminal 3 receives a manipulation performed by the user on the terminal-side manipulation unit 22. Note that, for the touch panel, any type, for example, a pressure-sensitive type, an electromagnetic induction type, or an electrostatic induction type can be used.

The terminal-side audio input output unit 23 has a microphone and a speaker, which are not shown, and receives a speech made by the user during a phone call and outputs a speech made by a phone call partner during the phone call. The terminal-side audio input output unit 23 also outputs, for example, a music file, a voice included in a video file stored in the terminal-side storage unit 26. The communication unit 24 performs a wide area communication for connecting to a public line network or the network 4. The communication unit 24 performs a phone call, a data transmission to the network 4, or a data reception from the network 4, and the like. The terminal-side position detection unit 25 has a GPS unit, a gyro sensor, or the like to detect a terminal position of the mobile communication terminal 3. Note that, since a method of detecting the terminal position using the GPS unit or the like is well known, a detailed description thereof is omitted herein. The terminal-side storage unit 26 stores phone book data, music data, and the like and also stores various application programs executed by the terminal device, various data stored by the user, and the like.

The terminal-side connection unit 27 performs a communication with the facility search device 2. As described above, in the present embodiment, the wireless communication method based on BT is used. Thus, the mobile communication terminal 3 is BT-connected with the facility search device 2. The terminal-side connection unit 27 has a data communication profile (DATA COMM PROFILE) 27a for data communication. Similarly to the facility search device 2, the mobile communication terminal 3 is connected with the facility search device 2 based on the data communication profile. In the present embodiment, the data communication profile of BT corresponds to SPP, DUN, or the like. The profile included in the terminal-side connection unit 27 is not limited to the data communication profile. The terminal-side connection unit 27 may also have, for example, a profile for a hands-free phone call. In the case of BT, the profile for a hands-free phone call corresponds to a Hands-Free Profile (HFP).

The following will describe an operation performed by the above-described configuration. Note that, in flowcharts shown below, the mobile communication terminal 3 is abbreviated as MT and the facility search device 2 is abbreviated as APPA.

Figure 4:
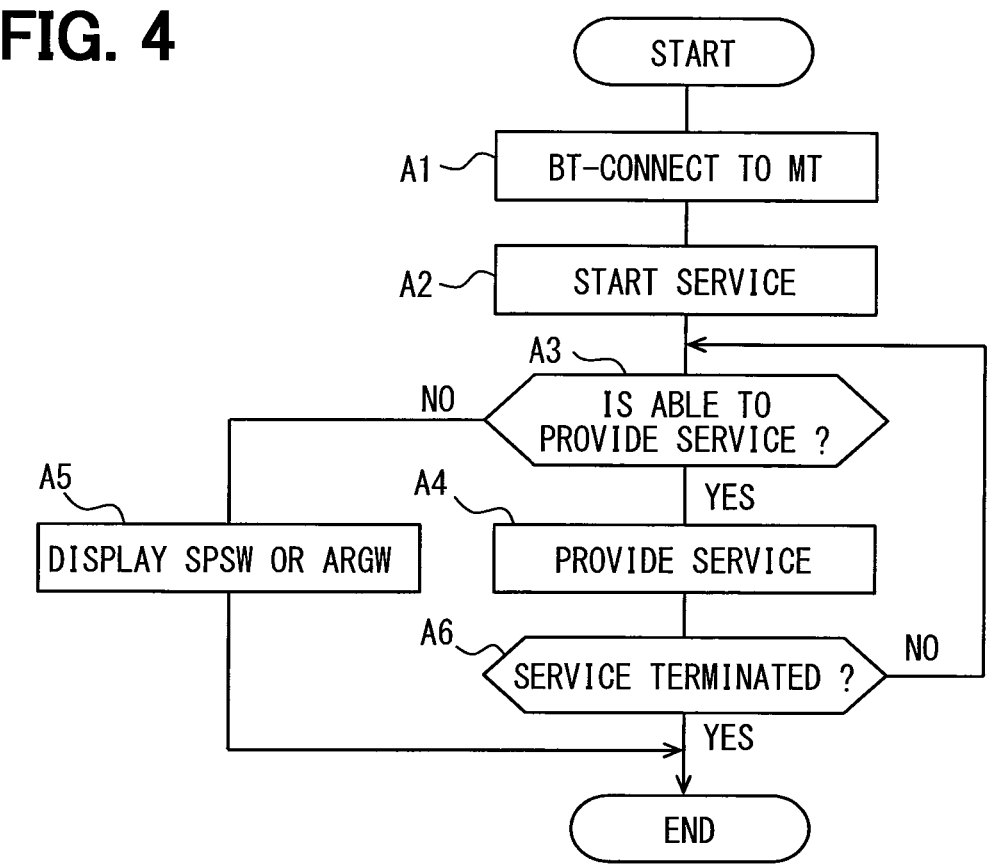
FIG. 4 is a flowchart of a main control process executed by the facility search device.
Figure 5:
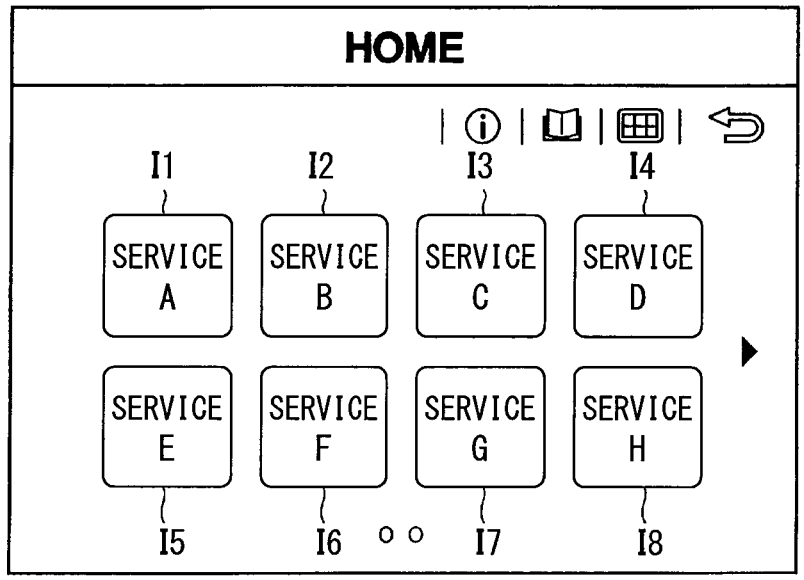
FIG. 5 is a diagram schematically showing a home screen of the facility search device.

First, the process performed by the facility search device 2 will be described with reference to FIGS. 4 to 7. As shown in FIG. 4, when the process starts (when the ACC of the vehicle is turned ON), the facility search device 2 connects to the mobile communication terminal 3 (MT) based on BT (A1) and starts the service (A2). In the start of the service at A2, the facility search device 2 activates a cooperation with the mobile communication terminal 3 to perform the service (content) provided by the content server 6 via the mobile communication terminal 3. At the same time, as shown in FIG. 5, the facility search device 2 displays a home screen in which icons I1 to I8 corresponding to respective services to be used are arranged on the vehicle-side display unit 11. Then, the user performs a touch manipulation on one of the icons I1 to I8 to select the intended service (see FIG. 1). The icon I1 corresponds to the service A, the icon I2 corresponds to the service B, the icon I3 corresponds to the service C, and other icons correspond to respective services. The home screen is also referred to as a service selection window (SSW) and includes multiple icons corresponding to multiple SNS services. Note that types and a quantity of the contents are not limited to the example shown in FIG. 5.

Subsequently, as shown in FIG. 4, the facility search device 2 determines whether or not the facility search device 2 is able to provide the selected service (A3). More specifically, at A3, it is determined whether or not initialization for using the service provided by the content server 6 has been finished. For example, when the user has multiple SNS accounts, the facility search device 2 needs to determine which SNS is to be used by the user. Since the check-in service is provided by the SNS, before the use of the check-in service with the facility search device 2, the user is required to register the SNS account information. As a result, when the facility search device 2 cannot provide the service, that is, when the initialization has not been finished yet (A3: NO), the facility search device 2 displays a service provider selection window (SPSW) or an account registration guidance window (ARGW) for registering an account (A5). The service provider selection window is also referred to as a service source selection window.

Figure 6:
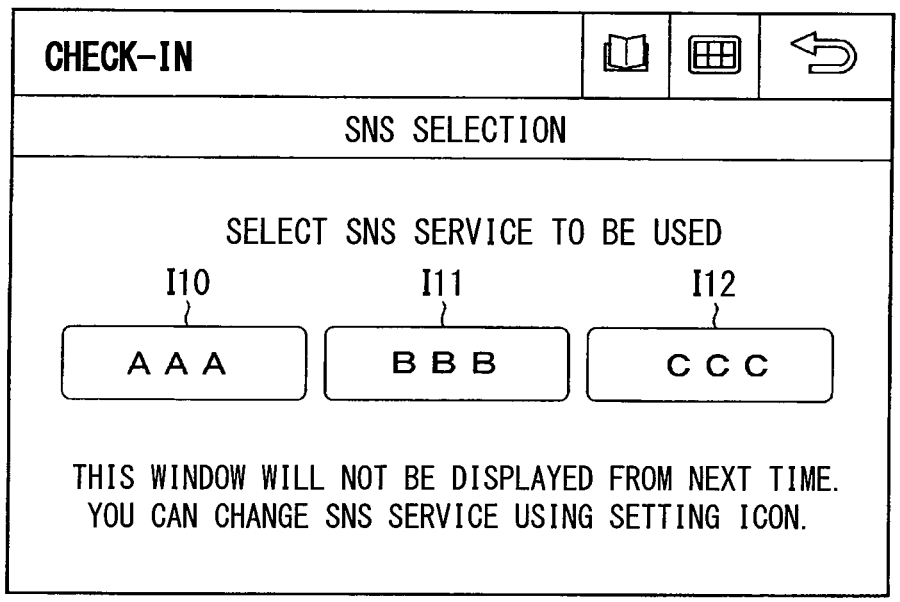
FIG. 6 is a diagram schematically showing a SNS service selection window displayed on the facility search device.
Figure 7:
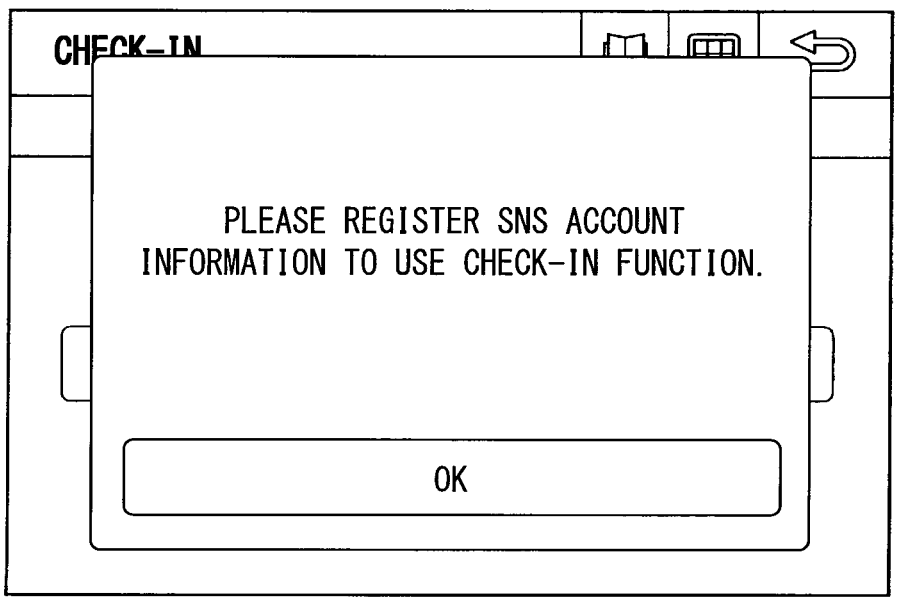
FIG. 7 is a diagram schematically showing an account registration guidance window displayed on the facility search device.

At A5, the facility search device 2 displays, for example, the SNS service provider selection window shown in FIG. 6 to notify the user to select one of the SNSs to be used. In the case of FIG. 6, as a list of the already registered SNSs, an icon I10 corresponding to the provider AAA, an icon I11 corresponding to the provider BBB, and an icon I12 corresponding to the provider CCC are displayed. The user performs a touch manipulation on one of the icons I10 to I12 to select the SNS to be used. The selected SNS is stored in, for example, the vehicle-side storage unit 15 or the like. Thus, in next activation of the facility search device 2, the user need not perform a selecting manipulation. When none of SNS account information has been registered, as shown in FIG. 7, the facility search device 2 displays an account registration guidance window including a message, for example, "Please register SNS account information to use check-in function" in order to notify the user to register the SNS account information.

As shown in FIG. 4, when the initialization has been already performed and the facility search device 2 is able to provide the selected service (A3: YES), the facility search device 2 acquires the content from the content server 6 via the mobile communication terminal 3 in response to the user's manipulation and provides the service (A4). Then, the facility search device 2 continues to provide the service until the user gives an instruction to terminate the service being provided (A6: NO). When the user gives a termination instruction (A6: YES), the facility search device 2 ends the process.

With above-described configuration, the facility search device 2 provides the service selected by the user.

The following will describe an operation of the facility search system 1 in response to a selection of the check-in service by the user with reference to FIGS. 8 to 12. Note that the check-in service is available at any time. The present embodiment will describe, as an example, a case in which the check-in service is used when the user arrives at the preliminarily set destination. Therefore, in the description below, a process of the check-in service also includes a navigation process for guiding the vehicle to the destination.

Figure 8:
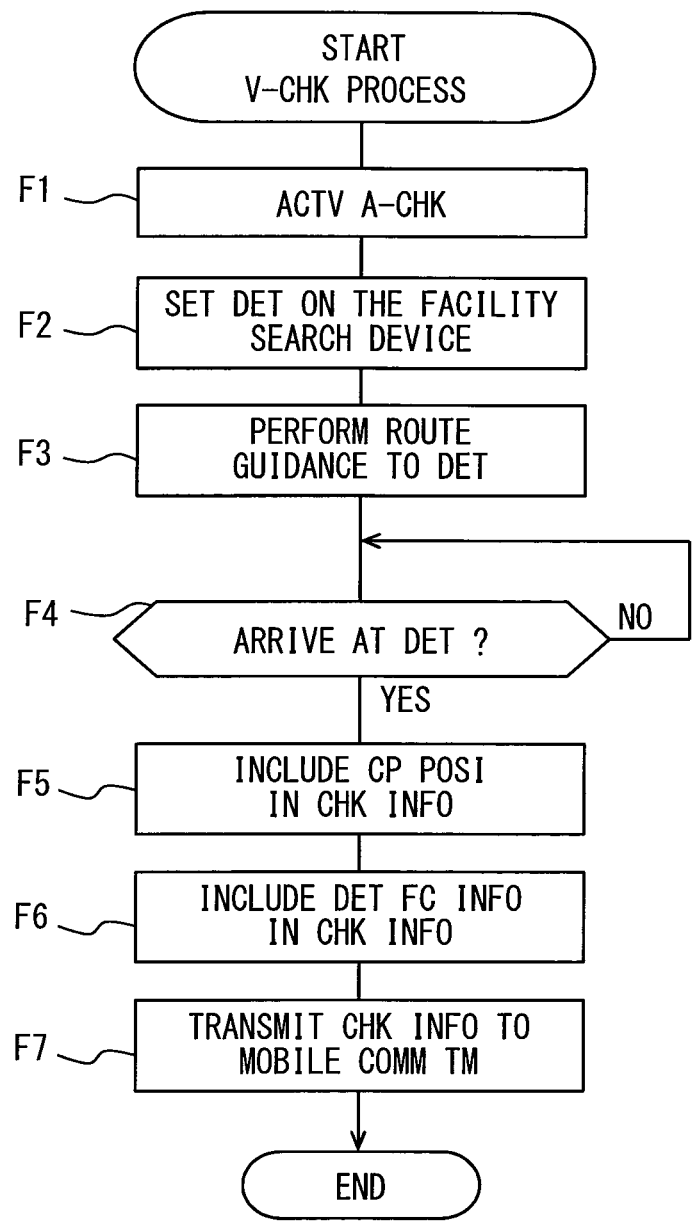
FIG. 8 is a flowchart of a check-in process executed by the facility search device.

The facility search device 2 performs a device-side check-in process (V-CHK PROCESS) shown in FIG. 8, in response to a touch manipulation on the icon I2 corresponding to the check-in service (in the present embodiment, it is assumed that the service B corresponds to the check-in service) in the home screen shown in FIG. 5. Specifically, the vehicle-side control unit 10 of the facility search device 2 performs the check-in process shown in FIG. 8.

First, the facility search device 2 activates (ACTV) an automatic check-in (A-CHK) (F1). The automatic check-in is a setting for allowing the facility search device 2 to automatically perform the check-in process regardless of a manipulation performed by the user at the time of arriving at the destination facility. The setting of the automatic check-in corresponds to an automatic registration setting. In the present embodiment, the setting of the automatic check-in is performed during the check-in process. However, the activation of the automatic check-in is not limited during the check-in process. As another example, the automatic check-in may also be performed before the check-in process. In this case, the facility search device 2 may be configured to determine whether the setting of the automatic check-in has been activated or not during the check-in process, and determine whether to activate the automatic check-in depending on the determination result. As another example, before the start of the check-in process, a destination facility may be set in advance on another display window, and the touch manipulation on the icon 12 may be recognized as a "manipulation for activating the setting of the automatic check-in".

Subsequently, the facility search device 2 sets a destination (DET) using a first database (1ST DB) 15a (see FIG. 2) stored in the vehicle-side storage unit 15 (F2). Specifically, the facility search device 2 sets the destination based on destination facility information for setting the destination similar to a well-known navigation device. The destination facility information is stored in the first DB 15a, and includes at least information indicating a destination facility position, a facility name, and a phone number. Here, the information indicating the destination facility position is information, for example, a longitude and latitude, an address, a zip code, and several digits of numbers and alphabets set to each segmental area having a predetermined size. The first DB 15a corresponds to a vehicle-side database.

Subsequently, the facility search device 2 performs route retrieval based on the map data stored in the vehicle-side storage unit 15 and performs route guidance based on the retrieved route (F3). During the traveling, the facility search device 2 continuously detects the device position, and displays a navigation window which includes a map window, the vehicle position and the like on the vehicle-side display unit 11. The facility search device 2 continues the route guidance (F3) until arrival at the destination (F4: NO). The detection of the device position performed at B3 and B4 corresponds to a device position detection process. Note that, in the present disclosure, the route guidance is not a mandatory process.

When the device position of the vehicle matches with the destination facility set at F2, the facility search device 2 determines that the vehicle has arrived at the destination (F4: YES). As another example, the facility search device 2 may also determine that the vehicle has arrived at the destination facility when the device position is located within a predetermined range from the destination facility. With this configuration, the facility search device 2 can determine the arrival of the vehicle at the destination facility even though the vehicle is not accurately positioned at the destination facility caused by an unavoidable reason, for example, an entrance forbidden made on the vehicle into the destination facility or a destination facility parking lot positioned apart from the destination facility.

The facility search device 2 includes the device position (CP POSI) in check-in information (F5) and also includes the destination facility information (DET FC INFO) in the check-in information (F6). Here, the check-in information (CHK INFO) is information to be transmitted from the facility search device 2 to the mobile communication terminal 3 to notify the mobile communication terminal 3 of the destination facility. The check-in information includes at least the device position and the destination facility information for specifying the destination facility that has been set. Thus, as will be described later, the mobile communication terminal 3 is able to register the visited facility in the content server 6 based on the check-in information.

When the setting of the check-in information is completed, the facility search device 2 transmits the check-in information to the mobile communication terminal 3 (F7). At this time, when the setting of the automatic check-in has been activated, the facility search device 2 automatically transmits the check-in information to the mobile communication terminal 3. That is, in the facility search system 1, when the setting of the automatic check-in has been activated, the check-in is automatically performed regardless of a manipulation performed by the user. A process in which the facility search device 2 controls the mobile communication terminal 3 to perform the registering of the set destination facility as the visited facility in the content server 6 corresponds to a registration process. Also, a computer program provided for performing the registration corresponds to a facility search program.

Figure 9:
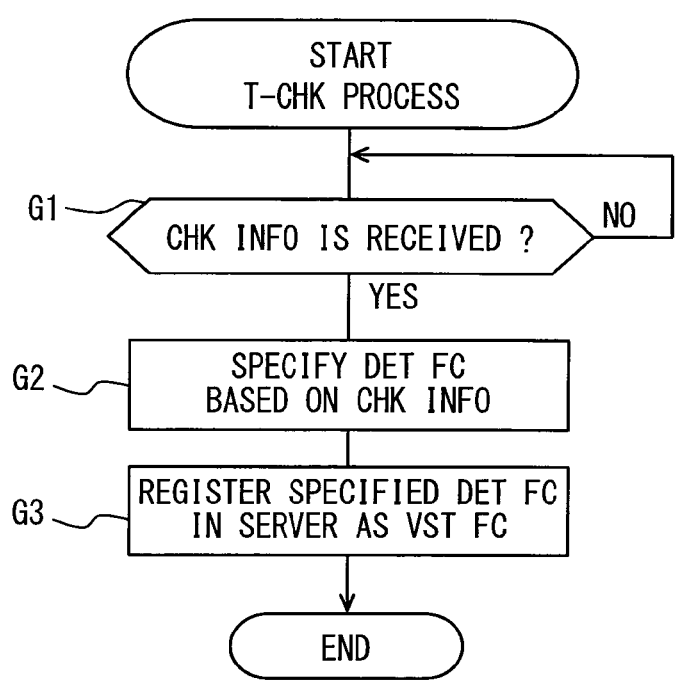
FIG. 9 is a flowchart of a process executed by the mobile communication terminal.

The mobile communication terminal 3 repeatedly performs the terminal-side check-in process (T-CHK PROCESS) shown in FIG. 9 when connected with the facility search device 2. Specifically, the terminal-side control unit 20 of the mobile communication terminal 3 repeatedly performs the terminal-side check-in process shown in FIG. 9. The terminal-side check-in process may also be performed only when the facility search device 2 is configured to transmit the setting of the destination facility to the mobile communication terminal 3 and the destination facility has been set. This configuration eliminates an unnecessary process in the mobile communication terminal 3 and can reduce power consumption of the mobile communication terminal 3.

In the terminal-side check-in process, the mobile communication terminal 3 determines whether the check-in information transmitted from the facility search device 2 has been received (G1). On receiving of the check-in information (G1: YES), the mobile communication terminal 3 specifies the destination facility (DET FC) based on the check-in information (G2). Then, the mobile communication terminal 3 registers the specified destination facility as a visited facility (VST FC) in the content server 6 (G3).

Thus, in the facility search system 1, the check-in is performed when arrived at the destination facility set by the user. More specifically, the destination facility can be preliminarily set as a check-in target before arrival at the destination facility and check-in of the destination facility is automatically performed at the time of arrival at the destination facility.

According to the present embodiment described above provides the following advantages.

When the facility search device 2 of the facility search system 1 determines the arrival at the preliminarily set destination facility, the facility search device 2 performs the check-in process (registration process) for checking in the destination facility. That is, since the destination facility is set as the check-in target in advance, the user can perform the check-in after arrival at the destination without further manipulation, such as the selection of the facility, a keyword search, or the like. That is, the user can perform the check-in with less times of manipulations.

Since the facility search device 2, which has higher position detection accuracy than the mobile communication terminal 3, is used for detecting the device position, the position of the destination facility can be detected with a high accuracy. That is, an accuracy of specifying the destination facility as the check-in target is improved, and a possibility of erroneously determining a different facility as the destination facility is reduced. This configuration enables correct setting of the facility intended by the user as the check-in target, and improves a convenience.

The destination facility is set as the check-in target facility. Thus, even when the user is not positioned in the vicinity of the destination facility, the user can set the destination facility as the check-in target facility. Accordingly, this configuration improves a convenience when using the check-in service.

The check-in target facility is set as the destination facility in advance. Thus, different from a conventional check-in service, when multiple facilities exist around the device position, a possibility of erroneously checking in different facilities existing around the device position as the check-in target facility can be avoided. That is, the above configuration can set check-in target precisely. This configuration can improve a satisfaction level of the check-in service.

When the automatic check-in has been activated, the check-in can automatically be performed at the time of arrival at the destination facility. This configuration can reduce a possibility in which the check-in is not performed caused by forgetting of the check-in manipulation by the user.

(Second Embodiment)

The following will describe a second embodiment of the present disclosure with reference to FIGS. 10 to 14. In the second embodiment, a part of the check-in process is different from that in the first embodiment. In the present embodiment, each of the in-vehicle device 2, the mobile communication terminal 3, and the facility search system 1 has a similar configuration with the first and second embodiments. Thus, a detailed description thereof is omitted.

When, for example, a navigation device is assumed as the in-vehicle device, the navigation device includes a database (hereinafter referred to as a vehicle-side DB) storing destination information for setting a destination. The check-in service provides facility information based on the database (hereinafter referred to as a server-side DB) stored in the server managed by a content provider or the like. The server-side DB is different from the vehicle-side DB. Thus, the vehicle-side DB and the server-side DB do not always have the same information. Thus, when a check-in is performed to the selected facility (for example, destination facility) in the in-vehicle device using the vehicle-side DB, the server-side DB may not include a facility corresponding to the selected facility in the in-vehicle device, and the check-in of the destination facility cannot correctly be performed.

Regarding above-described difficulty, in the facility search system 1, consistency is achieved between different databases as follows. For the sake of convenience, the databases are referred to as DB.

Figure 10:
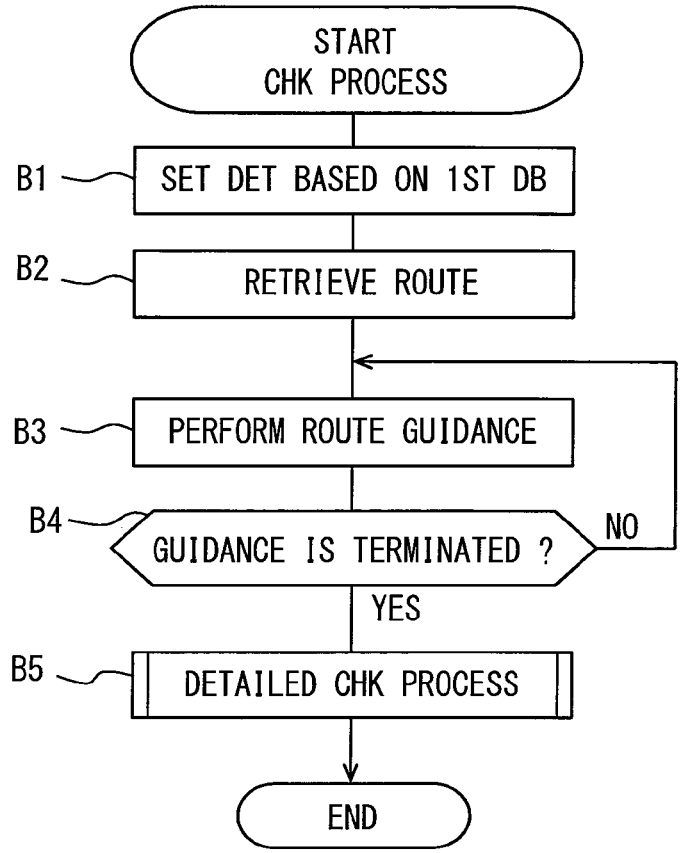
FIG. 10 is a flowchart of a check-in process executed by a facility search device according to a second embodiment of the present disclosure.

In the home screen shown in FIG. 5, when the icon I2 corresponding to the SNS service that provides the check-in service is touched, the facility search device 2 of the facility search system 1 performs the check-in process shown in FIG. 10. The facility search device 2 sets the destination based on the first DB 15*a* (see FIG. 2) that is stored in the vehicle-side storage unit 15 (B1), similar to F2 in the first embodiment.

Subsequently, the facility search device 2 performs route retrieval based on the map data stored in the vehicle-side storage unit 15 (B2) and performs route guidance based on the retrieved route (B3). During the travelling, the facility search device 2 continuously detects the device position and displays a navigation window which includes a map window, the position of the vehicle, and the like on the vehicle-side display unit 11. The facility search device 2 continues the route guidance (B3) until arrival at the destination (B4: NO). The detection of the device position performed in B3 and B4 corresponds to the device position detection process.

The facility search device 2 performs a detailed check-in process (B5) on determining that the vehicle has arrived at the destination, i.e., when the route guidance is ended (B4: YES). In this case, in the same manner as in the first embodiment, the facility search device 2 may also determine that the vehicle has arrived at the destination facility at the time when the device position reaches a point within a predetermined distance range from the destination facility. The facility search device 2 in the present embodiment is configured to also perform the detailed check-in process in B5 when detecting that the vehicle has arrived at the destination and has stopped running.

In the detailed check-in process shown in FIG. 10, the facility search device 2 transmits device position information to the server (transmits to the content server 6 via the intermediate server 5 in the present embodiment) (C1) and acquires information on facilities around the device position from the server (C2). At this time, the facility search device 2 refers to the information stored in the vehicle-side storage unit 15 and transmits the device position information to the SNS server selected in A5 described above (content server 6 managed by the SNS provider). Subsequently, the server searches the second DB 6*a* (see FIG. 1) for the facilities positioned within a preset search range including the terminal position of the mobile communication terminal, and transmits facility information including at least information indicating positions for specifying the facilities, the facility names, and the facility phone numbers to the facility search device 2. The process executed at C1 corresponds to a transmission process. The process executed at C2 corresponds to an acquisition process.

On acquiring the information on the facilities around the device position from the server, the facility search device 2 compares the destination facility information with the facility information acquired from the server (C3). Subsequently, the facility search device 2 determines whether the facilities acquired from the server include a facility that has geographic coordinates (GC) equal to or extremely close to geographic coordinates of the destination facility (C4). When the facility search device 2 determines that the facilities acquired from the server include a facility that has geographic coordinates equal to or extremely close to geographic coordinates of the destination facility (C4: YES), the facility search device 2 further determines whether the facilities acquired from the server include only one facility that has geographic coordinates equal to or extremely close to geographic coordinates of the destination facility (C5). For example, when there are multiple facilities in a building, there may be multiple facilities associated with the same geographic coordinates, that is, longitude and latitude. Accordingly, the facility search device 2 checks the number of the corresponding facilities and, when the number of the facilities is one (C5: YES), the facility search device 2 displays the name of the facility and a check-in button (C7). That is, the facility search device 2 acquires the information on the peripheral facility to be set as the check-in target from the server, and automatically determines the destination facility to be set as the check-in target in the acquired peripheral facility information. The process of extracting the facility at C3 to C7 corresponds to an extraction process.

Figure 12:
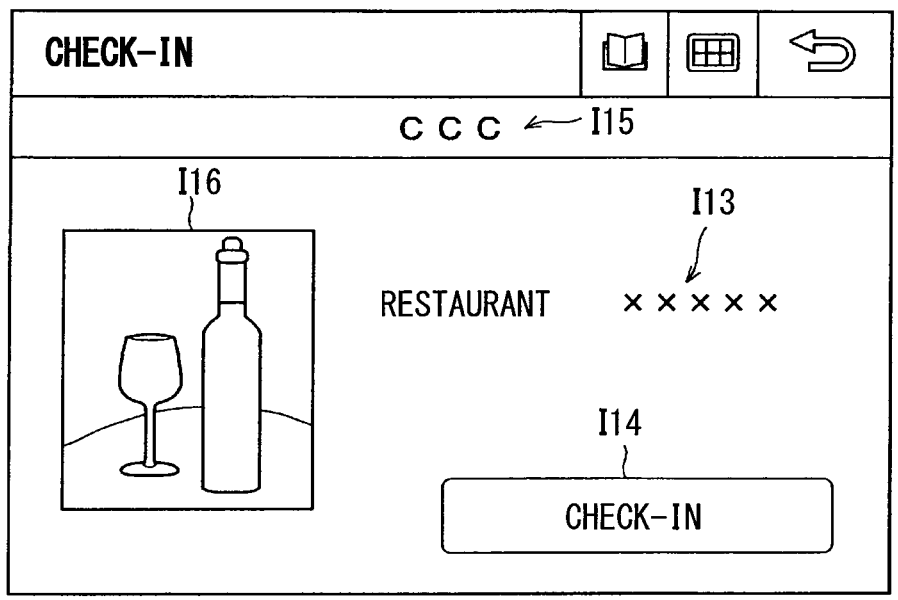
FIG. 12 is a diagram schematically showing a check-in window displayed on the facility search device.
Figure 13:
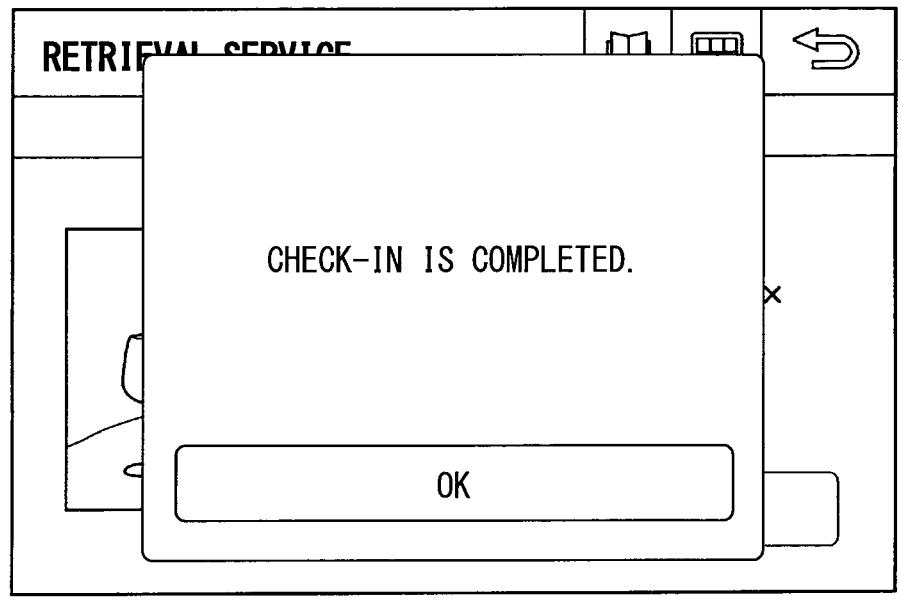
FIG. 13 is a diagram schematically showing a check-in completion window displayed on the facility search device.

More specifically, as shown in FIG. 12, the facility search device 2 displays a facility name I13 ("Restaurant xxxxx" in FIG. 12) specified based on the facility information, a check-in button I14, and a SNS service I15 (the provider CCC in FIG. 12) from which the facility information has been transmitted. At this time, the facility search device 2 may also display, for example, an image I16 included in the facility information.

Then, when a touch manipulation is performed by the user on the check-in button I14 (C8: YES) in the detailed check-in process shown in FIG. 11, the facility search device 2 transmits check-in information indicating an intention to check in the facility to the mobile communication terminal 3 to control the mobile communication terminal 3 to check in the visited facility in the server and displays the check-in completion window shown in FIG. 13 (C9). The process in C9 corresponds to a part of the registration process. Then, the facility search device 2 ends the detailed check-in process shown in FIG. 11 and returns to the check-in process shown in FIG. 10.

When there are multiple facilities in the building as described above, there may be multiple facilities having the same longitude and latitude. Accordingly, when the number of facilities having the same longitude and latitude is not equal to one (C5: NO), the facility search device 2 determines whether the multiple facilities include a facility that has the same phone number or the same name with the destination facility (C6). At this time, in a determination of whether or not there is a facility having the same name, the facility search device 2 not only determines whether or not there is a facility having exactly the same name as that of the destination facility but also determines whether or not there is a facility having a name which is partly the same as that of the destination facility. For example, a name in which a space, a hyphen, or the like is inserted or a name from which a corporate status such as "Co., Ltd." has been omitted. When there is a facility having the same phone number or the same facility name (C6: YES), the facility search device 2 extracts the facility as a check-in candidate and proceeds to C7 to perform a process as described above. Note that, even when there is only one facility having an extremely close longitude and latitude, a determination of whether or not the facility has the same phone number or name may also be performed. This is for checking whether a difference in longitude and latitude is an error and the facility is the same facility or whether a difference in longitude and latitude shows another facility.

Figure 14:
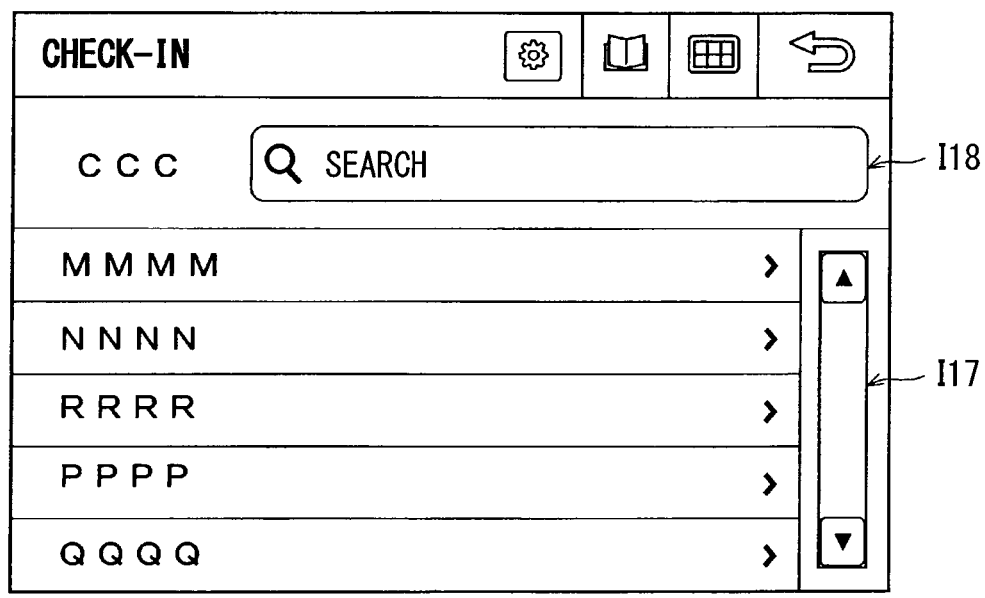
FIG. 14 is a diagram schematically showing a facility list window displayed on the facility search device.

When there is no facility having the same phone number or the same facility name (C6: NO), the facility search device 2 displays a list of the facility names included in the facility information (C10), as shown in FIG. 14. In the case of FIG. 14, the names (for example, "MMMM" and "NNNN") of multiple facilities present in the vicinity of the destination facility are displayed. The user can select the facility as the destination in the list window. At this time, when there exists large number of facilities, the subsequent part of the list can also be viewed by operating a scroll button I17. That is, when there is no peripheral facility determined to correspond to the destination facility, the facility search device displays a list of the peripheral facility information to notify the user to select.

Even when there are multiple facilities each having the same longitude and latitude, the same phone number, and the same facility name, the facility search device 2 proceeds to C10. Specifically, when "First Wing of OO Department Store" and "Second Wing of OO Department Store" each having the same main-line phone number are adjacent to each other, each of the wings is located within a range serving as the basis on which the vehicle is determined to have arrived at the destination facility. Then, it is assumed that each of the wings registered in the first DB 15a has the name "OO Department Store", while the wings registered in the second DB 601A have the names "First Wing of OO Department Store" and the "Second Wing of OO Department Store". In this case, the facility search device 2 acquires "First Wing of OO Department Store" and "Second Wing of OO Department Store" as the peripheral facility information, but may not be able to determine which one is the destination facility. Accordingly, even when there are multiple peripheral facilities each serving as a candidate and it is impossible to specify one of the peripheral facilities as the destination facility, the facility search device 2 displays a list of the peripheral facility information to notify the user to select.

Figure 11:
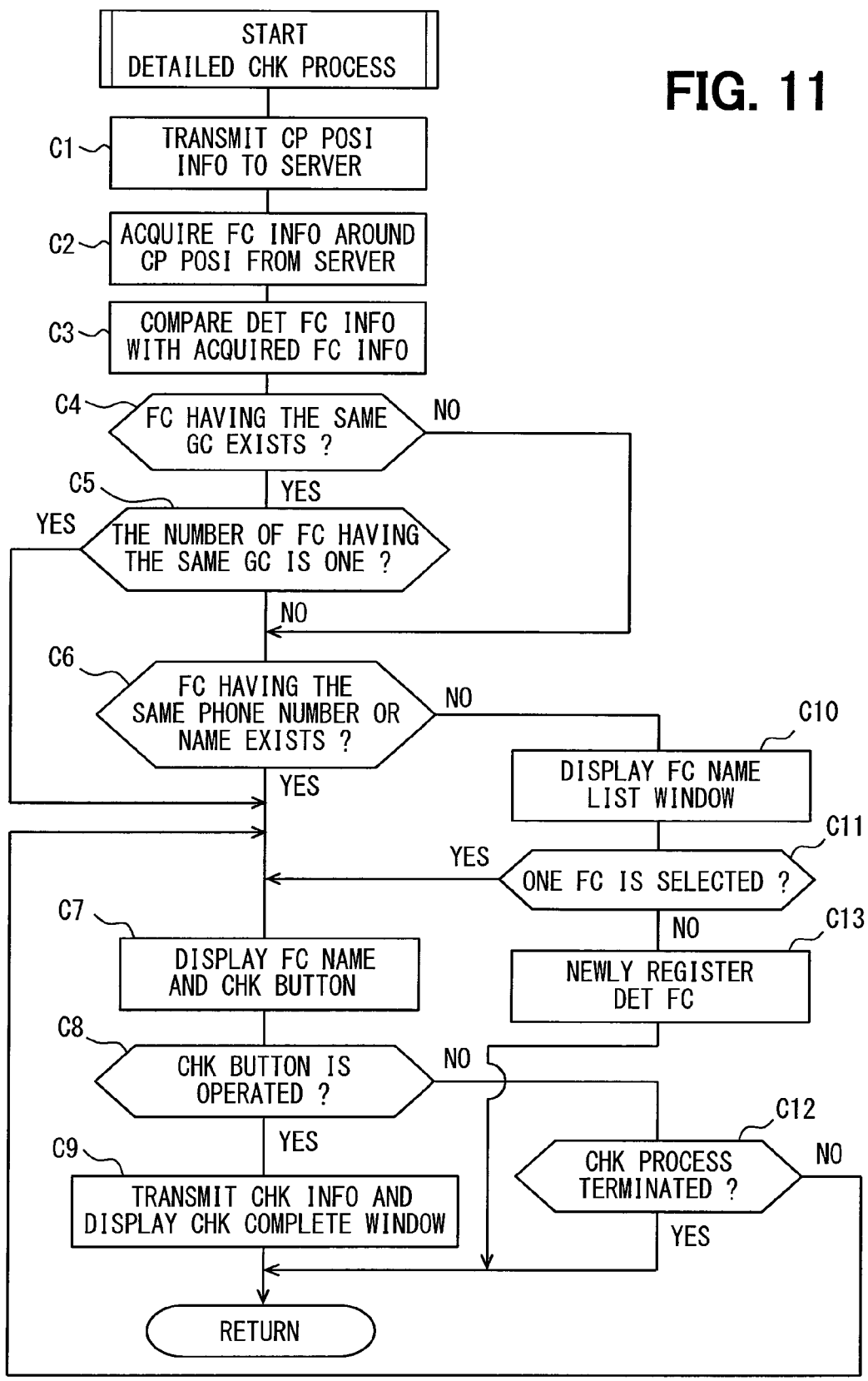
FIG. 11 is a flowchart of a detailed check-in process executed by the facility search device.

When one of the facilities is selected by the user, since the facility has been selected by the user in the detailed check-in process shown in FIG. 11 (C11: YES), the facility search device 2 qualifies the selected facility as the check-in candidate and proceeds to C7. Then, the facility search device 2 performs a check-in as described above.

When there is no facility having the same longitude and latitude or an extremely close longitude and latitude or the same phone number or facility name in the acquired facility information as described above (C6: NO) and when there is no corresponding facility in the list window (C10, C11: NO), the facility search device 2 newly generates information on the destination facility to which a check-in is intended to be performed and then performs a check-in (C13). At this time, the facility search device 2 transmits the position, the name, the phone number of the destination facility to the server, and the server registers the position, the name, the phone number of the destination facility, and registers the facility as the visited facility. Here, it is possible to cause the user to input the newly generated facility information from an input screen and then transmit the newly generated facility information to the server. Alternatively, the newly generated facility information may be transmitted to the server using the facility information of the destination stored in the DB (i.e., without causing the user to input the facility information).

When the user performs a terminating manipulation without manipulating the check-in button I14 (C8: NO and C12: YES), the facility search device 2 ends the detailed check-in process and returns.

The facility search device 2 compares the destination facility information stored in the first DB with the facility information stored in the second DB, and extracts the facility to be set as the check-in candidate. Then, when the user performs a check-in manipulation that intends to check in the extracted facility, the facility search device 2 transmits, to the server, information on a request to check in the facility together with the current time. Then, the server registers a check-in record indicating that the user visited the facility at the received current time, and manages the check-in record of the user.

The present embodiment described above provides the following advantages, in addition to the advantages provided by the first embodiment.

In the facility search system 1, the facility search device 2 compares the destination facility information which is the facility information for setting the destination stored in the first database of the facility search device 2 with the peripheral facility information which is the facility information of the peripheral facilities around the device position extracted from the facility information stored in the second DBes 601A to 603A of the content server 6 which provides the check-in service. Then, the facility search device 2 extracts, as the destination facility, any facility having two or more matching information items among the information indicating the position, the name, and the phone number which are included in each of the destination facility information and the peripheral facility information. That is, the facility search device 2 acquires information from each of the different databases. Then, the facility search device 2 causes the extracted destination facility to be registered (checked in) as the visited facility in the server. As a result, even when facility information is stored in the DBes having different contents, it is possible to easily and properly register the facility visited as the destination.

When the facility to be set as the check-in candidate and extracted based on the information indicating the position is single, the facility search system 1 automatically displays the name of the facility and the check-in button I14 in C7 of FIG. 10. This configuration eliminates the need for performing a selecting manipulation by the user.

On determining that the vehicle has arrived at the destination, the facility search system 1 performs the check-in process. Here, the mobile communication terminal detects the approach of the device position to a point within a predetermined distance range from the destination and determines that the vehicle has arrived at the destination. Then, the facility search device 2 transmits the device position information, acquires the facility information of peripheral facilities around the device position from the server, and automatically extracts, as the check-in candidate, the facility corresponding to the facility information matching the destination facility information. This eliminates the possibility of forgetting to perform a check-in at the time of arrival at the destination and also eliminates the need for a user's manipulation for searching for the check-in candidate to allow an improvement in convenience.

The facility search system 1 displays the facility information, such as the name of the extracted facility, to the user. When a manipulation (determining manipulation) is performed by the user on the check-in button I14, the facility search system 1 transmits the check-in information indicating the intention to check in the facility. This can prevent an erroneous check-in from being performed and can also satisfy the need of the user who does not want to perform a check-in.

When there are multiple facilities each serving as the check-in candidate, the facility search system 1 displays a list of the facility names and also displays a search button I18 to allow the user to search for the check-in candidate. As a result, it is possible to more precisely specify the facility to which a check-in is to be performed.

In the present embodiment, the facility search system 1 performs the detailed check-in process when detecting that the vehicle has arrived at the destination and stopped travelling. Consequently, the window for the check-in service is not displayed while the vehicle is moving. This can prevent the user from watching of the display screen, and improves a driving safety.

When a facility search program product including an instruction to be executed by a computer for performing the process described above and included in a non-temporary and tangible computer-readable storage medium is used, each of the advantages described above can be provided.

With the facility search device 2 (in-vehicle device) that operates in cooperation with the mobile communication terminal 3 capable of independently performing a check-in, it is possible to provide the advantages described above such that, even when the destination facility information and the facility information are stored in different DBes, the facility visited as the destination can easily and properly be registered or the check-in service can be used at the time of arrival at the destination.

The facility search device 2 is the in-vehicle device and can acquire the facility information from the content server 6 via the mobile communication terminal 3. That is, a user interface at the time of a check-in can be displayed in the facility search device 2 mounted in the vehicle. Then, by operating the facility search device 2, the check-in service can be used. This can enhance driving safety during a traveling of the vehicle.

(Third Embodiment)

Figure 15:
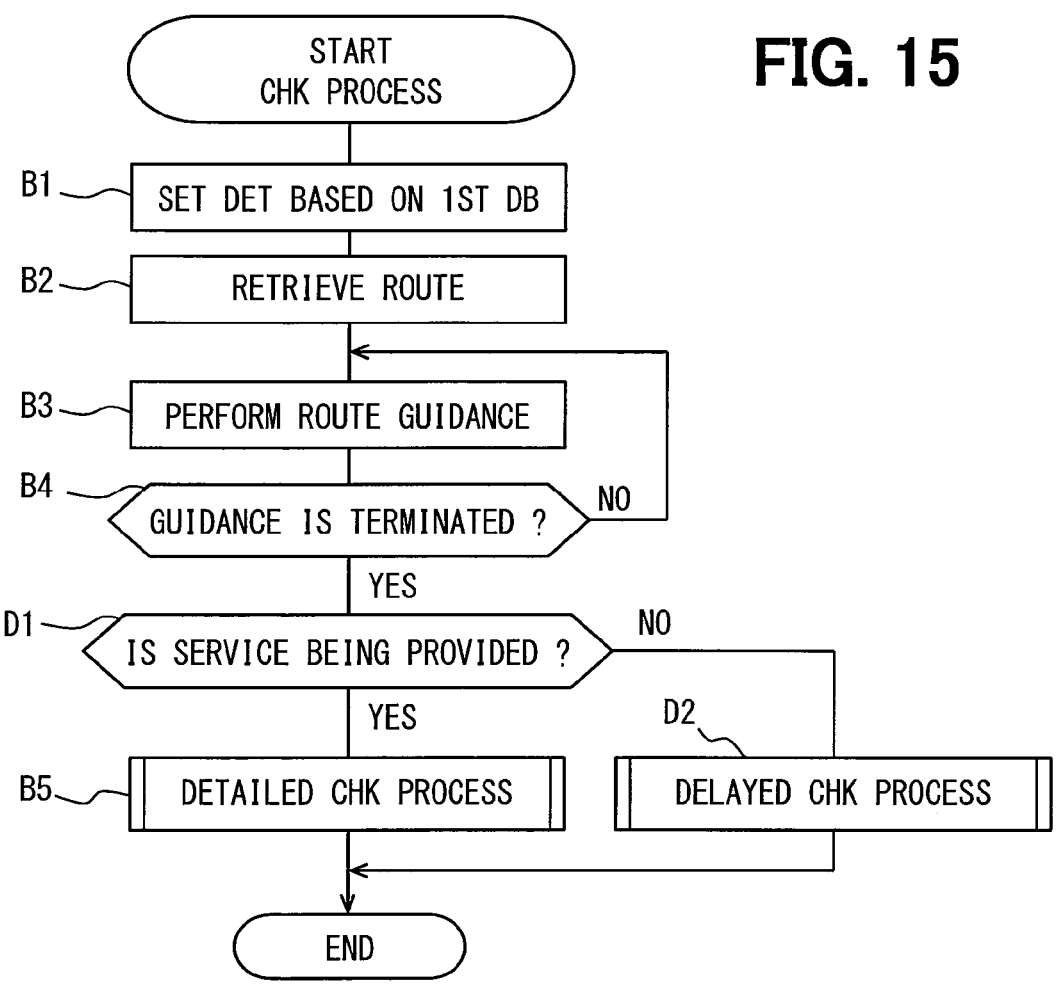
FIG. 15 is a flowchart of a check-in process executed by a facility search device according to a third embodiment of the present disclosure.
Figure 16:
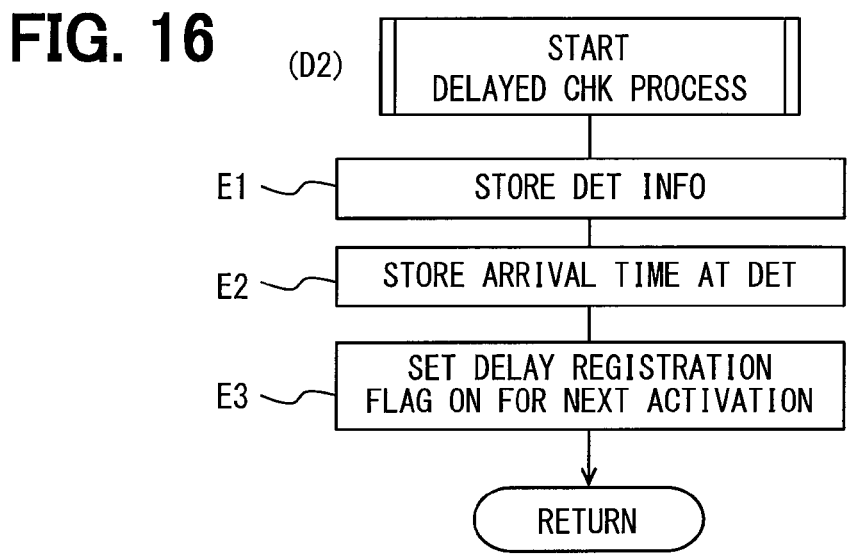
FIG. 16 is a flowchart of a delayed check-in process executed by the facility search device.

The following will describe a third embodiment of the present disclosure with reference to FIGS. 15 and 16. In the third embodiment, a part of the check-in process is different from the check-in process executed in the first embodiment. Each of the facility search device 2, the mobile communication terminal 3, and the facility search system 1 has a similar configuration with the first embodiment. In FIG. 15, processes similar to the processes in the second embodiment shown in FIG. 10 are designated by the same reference symbols, and a description of the similar processes will be omitted in the present embodiment.

In the home screen shown in FIG. 5, when a touch manipulation is performed on the icon I2 corresponding to the check-in operation, the facility search device 2 of the facility search system 1 according to the present embodiment sets a destination based on the first DB 15a (B1) in the check-in process shown in FIG. 15. Subsequently, the facility search device 2 retrieves a route (B2) and then detects the device position based on the retrieved route until arrival at a destination and performs the route guidance (B3). Then, on arriving at the destination (B4: YES), the facility search device 2 determines whether or not the service is being provided (D1). Here, the state where the service is being provided is a state where an application program, which controls the facility search device 2 cooperates with the mobile communication terminal 3, has been activated and the check-in service is being provided. When the service is being provided (D1: YES), the facility search device 2 performs a detailed check-in process (B5). In this case, the facility search device 2 performs the same process as in the second embodiment. Hereinafter, the application program may also be referred to as an application.

On the other hand, when the check-in service is not being provided, such as when the application has not been activated or when the power source of the mobile communication 3 has in an OFF state (D1: NO), the facility search device 2 performs a delayed check-in process. In the delayed check-in process shown in FIG. 16, the facility search device 2 maintains the facility information of the destination in the vehicle-side storage unit 15 (E1), maintains the time of arrival at the destination (E2), and turns on a delayed registration flag which is referenced when the check-in service becomes available in next time (E3). Here, the delayed registration flag is a flag (for example, data which is normally 0, and switches to 1 when the flag is turned ON) that indicates a presence of a destination whose check-in has not been finished yet.

When the application is activated next time and the check-in service becomes available, the facility search device 2 determines whether the delayed registration flag is in the ON state. Then, the facility search device 2 displays on the vehicle-side display unit 11 a message to notify the user whether to perform a check-in based on the destination facility information and the arrival time at the destination facility stored in the vehicle-side storage unit 15. That is, when the check-in service cannot be used at the arrival time at the destination, the facility search device 2 temporarily stores the destination facility information in the vehicle-side storage unit 15. In the case where the stored destination facility information has not been registered in the content server 6 (where the delayed registration flag is ON in the present embodiment), the facility search device 2 acquires the facility information of the peripheral facilities around the destination facility position from the content server 6 when the check-in service becomes available next time. As a result, even when the destination facility for which the user cannot perform the check-in, the user is able to perform the check-in of the destination facility later.

Note that the acquisition of the facility information or the like may be performed by similar process with the second embodiment. As another example, with respect to the destination facility which has not been checked in, the check-in may be carried out later without a confirming manipulation by the user.

(Other Embodiments)

The present disclosure can be modified or enhanced as follows without being limited to the examples shown in the foregoing embodiments.

In the first embodiment, the check-in is performed under a condition that a manipulation (touch manipulation on the icon I2) indicating an intention to perform the check-in is carried out by the user. As another example, when the destination is set, a process for performing the check-in may be performed in the background. That is, whether to use the check-in service may be set in advance. When the use of the check-in service is set in advance and the destination facility is set, the check-in may be performed in response to a determination of the arrival at the destination facility.

In the facility search system 1, the facility search device 2 cooperates with the mobile communication terminal 3. Thus, a detection of the device position or the terminal position may be performed by either the facility search device 2 or the mobile communication terminal 3. With this configuration, when the vehicle-side position detection unit 14 is not provided to the facility search device 2, the mobile communication terminal 3 can perform the position detection and acquire the position of the vehicle. Thus, advantages similar to the advantages provided by the foregoing embodiments can be provided. Also, the user who has not been able to use the check-in service due to the mobile communication terminal 3 not provided with the terminal-side position detection unit 25, becomes able to use the check-in service by using the facility search device 2 that has the vehicle-side position detection unit 14.

In the foregoing embodiments, when the number of the extracted facility is equal to one, the manipulation (see C8 in FIG. 11) is inputted by the user. As another example, when the number of the extracted facility is equal to one, the extracted facility may be registered automatically regardless of a manipulation made by the user. That is, the process executed at C8 in FIG. 11 may be omitted. This configuration can further improve the convenience for using the check-in service. Alternatively, an activation state and a deactivation state of the automatic registration can be set by the user. In this configuration, the setting state of the automatic registration is determined at C8. When the automatic registration is set to the activation state, the automatic registration is performed, and when the automatic registration is set to the deactivation state, a manipulation for performing the registration by the user is awaited.

In the foregoing embodiments, the description has been given on the assumption that the check-in service is performed, i.e., in response to the manipulation on the icon I2. As another example, the check-in service may be constantly in an available state without the manipulation by the user, and may perform the check-in at the time of arrival at the destination or at the time of a vehicle stop during the route guidance. That is, the destination arrival determination routine in the check-in process shown in FIG. 8 or similar process as the detailed check-in process shown in FIG. 10 may be performed in the background during the traveling of the vehicle. In this configuration, the system may transmit a stop position of the vehicle as the device position in C1, and acquire the peripheral facility information around the stop position from the server. As a result, even when the usability of the check-in service is forgotten by the user, a check-in service can also be performed. In this configuration, whether to activate the constant availability of the check-in service is settable by the user. Thus, this configuration also satisfies needs of a user who does not use the check-in service.

As another example, a traveled route, the vehicle stop position at which the vehicle stopped on the traveled route, the time of the vehicle stop, and the like may be stored, and a delayed check-in process may be performed similar to the third embodiment. Thus, when the user wants to check in a facility found during the route guidance, the configuration enables the check-in of the facility later. This can reduce a manipulation of the user who is driving while looking away from a vehicle window, which is undesirable in terms of driving safety. In this case, a time measurement unit may be provided. The time measurement unit measures elapsed time from the stop of the vehicle to the a restart of the movement from the stop position during the time period until arrival at the destination, and may determine that the user has visited a facility in the vicinity of the stop position when the vehicle has stopped for about 30 minutes or longer. This configuration can reduce the possibility of erroneously registering a vehicle stop due to a traffic light waiting, a bathroom break, or the like. As another example, when the vehicle has a short-time stop, a facility to be set as the check-in target in the vicinity of the vehicle stop position may be shown to the user. This can improve the quality of the check-in service by showing, to the user, a check-in candidate that has not been predicted by the user, or the like.

In the foregoing embodiments, the check-in service is performed in the selected SNS as an example. As another example, the check-in may be performed in multiple registered SNS (for example, AAA and BBB shown in FIG. 6) or all of the SNS (for example, AAA, BBB, and CCC shown in FIG. 6). That is, the facility search system 1 may also perform the acquisition of the facility information, the extraction of the destination facility from the acquired facility information, and the registration of the extracted destination facility in the content server 6 for all the SNS registered by the user. In this case, multiple SNS to be registered can be selectable by the user on a window shown in FIG. 6.

In the third embodiment, when the check-in service is interrupted but the connection to the mobile communication terminal 3 is continued, instead of turning ON the delayed registration flag in E3, the destination facility information may be transmitted to the mobile communication terminal 3 so that the mobile communication terminal 3 performs the check-in. That is, under a condition that use of the check-in service is activated, the check-in can be performed by the mobile communication terminal 3. Thus, the check-in service can be provided to the user even when the operation of the facility search device 2 is stopped. As a result, when the user walks from a parking lot to the destination facility, convenience can further be improved by allowing the user to perform the check-in using the mobile communication terminal 3 at the time of arriving at the destination facility or the like.

As the position information, information such as an address, a zip code, and several digits of numbers and alphabets set to a segmental area having a predetermined size is used. Further, longitude and latitude of the check-in target facility can be specified based on the above information, and determine whether a corresponding facility exists based on the specified longitude and latitude in C4 of FIG. 10.

In the foregoing embodiments, the destination has been set by the facility search device 2. As another example, the destination may be set by the mobile communication terminal 3 and destination information which enables the specifying of the destination may be is transmitted to the facility search device 2, and the facility search device 2 may set the destination facility based on the received destination information. Specifically, in F2 of the check-in process shown in FIG. 8, the mobile communication terminal 3 may set the destination facility on the facility search device 2 (in-vehicle device). With this configuration, when the user searches for and sets the destination at a place other than in the vehicle, for example, at his home, the manipulation for setting the destination after getting in the vehicle can be eliminated. Thus, a usability of the check-in service is improved. In this case, the determination of the arrival at the destination facility is performed by the facility search device 2 similar to the foregoing embodiments. Thus, a determination of the arrival at the destination can be accurately determined similar to the foregoing embodiments.

The facility search device 2 may further include a communication unit capable of communicating with the server 6. In this case, the facility search device 2 is able to configure the facility search system 1 independently. Alternatively, the mobile communication terminal 3 may further include a terminal position acquisition unit and a destination setting unit. In this case, the mobile communication terminal 3 may configure the facility search system 1 independently. Thus, the mobile communication terminal 3 is not limited to a vehicle use, but may also be used in other situations. That is, the facility search device 2 or the mobile communication terminal 3 may function as a portable terminal, and may configure the facility search system 1 independently by performing communication with the server 6.

In the foregoing embodiments, as the wireless communication method, Bluetooth (registered trademark) is described as an example. The wireless communication method is not limited to Bluetooth. As another example, a wireless LAN such as well-known WiFi or Wireless USB, which is an unwired version of USB, may be used as the wireless communication method.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A facility search system comprising:
   a mobile communication terminal communicably connected with a server and independently performing a registration process for registering a facility visited by a user as a visited facility in the server, the server providing a visited-facility registration service in which the facility visited by the user is registered as the visited facility; and
   an in-vehicle device provided in a vehicle and communicably connected with the mobile communication terminal, the in-vehicle device performing the registration process in cooperation with the mobile communication terminal,
   wherein, in the registration process, the in-vehicle device:
   acquires a device position indicating a current position of the vehicle;
   determines whether the vehicle arrives at a destination facility by comparing the device position with a position of the destination facility, the destination facility being preliminarily set in the in-vehicle device;
   controls the mobile communication terminal to register the destination facility as the visited facility in the server when determining that the vehicle arrives at the destination facility;
   the in-vehicle device includes a first database storing destination facility information that is used for setting the destination facility,
   the server includes a second database used in the visited-facility registration service, and
   in the registration process, the in-vehicle device further:
   sets the destination facility based on the first database;
   transmits the device position to the server via the mobile communication terminal when determining that the vehicle arrives at the destination facility;
   acquires a plurality of peripheral facility information items from the server, the plurality of peripheral facility information items being extracted by the server from the second database based on the device position, the plurality of peripheral facility information items corresponding to a plurality of peripheral facilities positioned around the device position; and
   registers one of the plurality of peripheral facilities, which corresponds to the destination facility, as the visited facility in the server, the plurality of peripheral facilities being specified based on the plurality of peripheral facility information items.

2. The facility search system according to claim 1,
   wherein the in-vehicle device activates or deactivates an automatic registration that enables an automatic execution of the registration process regardless of a user manipulation, and
   wherein, in a case where the automatic registration is activated, the in-vehicle device automatically performs, regardless of the user manipulation, the registration process when determining that the vehicle arrives at the destination facility.

3. The facility search system according to claim 1,
wherein the destination facility information includes two or more information items among an information item indicating the position of the destination facility, an information item indicating a name of the destination facility, or an information item indicating a phone number of the destination facility,
wherein each of the plurality of peripheral facility information items includes two or more information items among an information item indicating a position of the peripheral facility, an information item indicating a name of the peripheral facility, or an information item indicating a phone number of the peripheral facility, and
wherein, when the two or more information items included in the destination facility information correspond to and are equal to the two or more information items included in the one of the plurality of peripheral facility information items, the in-vehicle device determines that the peripheral facility specified by the one of the plurality of peripheral facility information items corresponds to the destination facility.

4. The facility search system according to claim 1,
wherein, when the in-vehicle device fails to determine the destination facility or determines that a quantity of the peripheral facilities corresponding to the destination facility is equal to or greater than two, the in-vehicle device shows, to the user, the peripheral facilities corresponding to respective peripheral facility information items, and performs the registration process for registering one of the peripheral facilities selected by the user as the visited facility.

5. The facility search system according to claim 1,
wherein, when the in-vehicle device determines that the vehicle stops running, the in-vehicle device
transmits, to the server, vehicle stop position information that indicates the device position detected when the vehicle stops running,
acquires, from the server, the peripheral facility information of the peripheral facility positioned around the device position detected when the vehicle stops running, and
performs the registration process for registering, as the visited facility, the peripheral facility positioned around the device position detected when the vehicle stops running.

6. The facility search system according to claim 1,
wherein the in-vehicle device maintains the destination facility and the device position detected when the vehicle arrives at the destination facility until a completion of the registration process, and performs the registration process based on the destination facility and the device position detected when the vehicle arrives at the destination facility.

7. The facility search system according to claim 1,
wherein the server includes a plurality of sub-servers each of which provides the visited-facility registration service, and
wherein the in-vehicle device performs the registration process with respect to one of the plurality of sub-servers selected by the user.

8. The facility search system according to claim 1,
wherein the server includes a plurality of sub-servers each of which provides the visited-facility registration service, and
wherein the plurality of sub-servers includes one or more sub-servers each of which provides the visited-facility registration service usable by the user, and the in-vehicle device performs the registration process with respect to all of the one or more sub-servers.

9. The facility search system according to claim 1
wherein, when the device position is within a predetermined range from the position of the destination facility, the in-vehicle device determines that the vehicle arrives at the destination facility.

10. The facility search system according to claim 1,
wherein the mobile communication terminal is configured to enable the user to input the destination facility to the in-vehicle device by performing a manipulation on the mobile communication terminal.

11. A facility search program product stored in a non-transitory tangible computer-readable storage medium and comprising instructions to be executed by an in-vehicle device that is provided in a vehicle and is communicably connected with a mobile communication terminal, the mobile communication terminal being communicably connected with a server and independently performing a registration process for registering a facility visited by a user in the server, the server providing a visited-facility registration service in which the facility visited by the user is registered as a visited facility, the instructions for implementing:
setting a destination facility based on a first database, the first database being used in a navigation function for performing a route guidance to the vehicle and storing destination facility information to be used for specifying the destination facility;
detecting a device position indicating a current position of the vehicle;
determining whether the vehicle arrives at the destination facility by comparing the device position with the destination facility information;
registering the destination facility as the visited facility in the server when determining that the vehicle arrives at the destination facility; wherein
the in-vehicle device includes a first database storing destination facility information that is used for setting the destination facility,
the server includes a second database used in the visited-facility registration service, and
in the registration process, the in-vehicle device further:
sets the destination facility based on the first database;
transmits the device position to the server via the mobile communication terminal when determining that the vehicle arrives at the destination facility;
acquires a plurality of peripheral facility information items from the server, the plurality of peripheral facility information items being extracted by the server from the second database based on the device position, the plurality of peripheral facility information items corresponding to a plurality of peripheral facilities positioned around the device position; and
registers one of the plurality of peripheral facilities, which corresponds to the destination facility, as the visited facility in the server, the plurality of peripheral facilities being specified based on the plurality of peripheral facility information items.

12. An in-vehicle device provided in a vehicle and communicably connected with a mobile communication terminal, the mobile communication terminal communicably connected with a server and independently performing a registration process for registering a facility visited by a user in the server, the server providing a visited-facility registration service in which the facility visited by the user is registered as a visited facility, the in-vehicle device comprising:
- a communication unit performing a communication with the mobile communication terminal;
- a storage unit including a first database, the first database being used in a navigation function for performing a route guidance to the vehicle and storing destination facility information to be used for specifying a destination facility;
- a destination setting unit setting the destination facility based on the destination facility information stored in the first database;
- a device position detection unit detecting a device position indicating a current position of the vehicle;
- an arrival determination unit determining whether the vehicle arrives at the destination facility by comparing the device position with the destination facility information;
- a control unit controlling the mobile communication terminal to perform the registration process for registering, in the server, the destination facility as the visited facility when the arrival determination unit determines that the vehicle arrives at the destination facility;
- an acquisition unit acquiring a plurality of peripheral facility information items stored in a second database, the second database being used by the server in the visited-facility registration service and different from the first database, the plurality of peripheral facility information items corresponding to a plurality of peripheral facilities, which are extracted by the server based on the device position and are positioned around the device position;
- an extraction unit extracting a peripheral facility, which corresponds to the destination facility, from the plurality of peripheral facilities based on the plurality of peripheral facility information items;
- an output unit outputting, to the user, the peripheral facility information item corresponding to the peripheral facility extracted by the extraction unit; and
- a manipulation unit receiving, from the user, a selecting manipulation of selecting, as the visited facility, the peripheral facility specified by the peripheral facility information item output by the output unit.

13. A facility search system comprising:
a mobile communication terminal communicably connected with a server and independently performing a registration process for registering a facility visited by a user as a visited facility in the server, the server providing a visited-facility registration service in which the facility visited by the user is registered as the visited facility; and
an in-vehicle device provided in a vehicle and communicably connected with the mobile communication terminal, the in-vehicle device performing the registration process in cooperation with the mobile communication terminal, wherein,
in the registration process, the in-vehicle device:
acquires a device position indicating a current position of the vehicle;
determines whether the vehicle arrives at a destination facility by comparing the device position with a position of the destination facility, the destination facility being preliminarily set in the in-vehicle device; and
controls the mobile communication terminal to register the destination facility as the visited facility in the server when determining that the vehicle arrives at the destination facility,
the in-vehicle device activates or deactivates an automatic registration that enables an automatic execution of the registration process regardless of a user manipulation, and,
in a case where the automatic registration is activated and the destination facility is preliminarily set in the in-vehicle device, the in-vehicle device automatically performs, without the user manipulation, the registration process when determining that the vehicle arrives at the destination facility that is preliminarily set.

* * * * *